(12) United States Patent
An et al.

(10) Patent No.: US 9,829,408 B2
(45) Date of Patent: Nov. 28, 2017

(54) DETECTION DEVICE AND DETECTION METHOD

(71) Applicants: BOE TECHNOLOGY GROUP CO., LTD., Beijing (CN); BEIJING BOE DISPLAY TECHNOLOGY CO., LTD., Beijing (CN)

(72) Inventors: Wuwei An, Beijing (CN); Liang Ma, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 301 days.

(21) Appl. No.: 14/803,372

(22) Filed: Jul. 20, 2015

(65) Prior Publication Data

US 2016/0084732 A1 Mar. 24, 2016

(30) Foreign Application Priority Data

Sep. 23, 2014 (CN) .......................... 2014 1 0490339

(51) Int. Cl.
*G01M 3/26* (2006.01)
(52) U.S. Cl.
CPC .................... *G01M 3/26* (2013.01)
(58) Field of Classification Search
None
See application file for complete search history.

(56) References Cited

U.S. PATENT DOCUMENTS 4,791,806 A * 12/1988 Wade ................. G01M 3/205
73/40.7
6,688,160 B2 * 2/2004 Hackett, Jr. .......... G01N 15/082
73/38

(Continued)

FOREIGN PATENT DOCUMENTS

CN 1707235 A 12/2005
CN 101718714 A 6/2010

(Continued)

OTHER PUBLICATIONS

1st Office Action issued in Chinese Application No. 201410490339.4 dated Jul. 22, 2015.

*Primary Examiner* — Paul West
*Assistant Examiner* — Mark A Shabman
(74) *Attorney, Agent, or Firm* — Nath, Goldberg & Meyer; Joshua B. Goldberg

(57) ABSTRACT

The present invention discloses a detection device and a detection method, wherein the detection device includes a seal chamber, a gas flow output unit and a gas flow detection unit, a substrate to be detected is horizontally placed in the seal chamber, the gas flow output unit is located in the seal chamber and below the substrate, the gas flow output unit is connected with the seal chamber, the gas flow output unit is used for outputting detection gas flow to the upper surface of the substrate, and the gas flow detection unit is used for detecting whether leak gas flow exists on the lower surface of the substrate. The leak gas flow exists on the lower surface of the substrate is detected by the gas flow detection unit, and whether the substrate is damaged is judged based on a detection result of the gas flow detection unit.

15 Claims, 2 Drawing Sheets

(56) References Cited

U.S. PATENT DOCUMENTS

| | | | | |
|---|---|---|---|---|
| 7,383,720 | B2* | 6/2008 | Buerkle | G01M 3/20 |
| | | | | 73/159 |
| 7,964,040 | B2* | 6/2011 | Rasheed | C23C 16/4412 |
| | | | | 134/1 |
| 8,448,497 | B2* | 5/2013 | Omori | G01N 15/08 |
| | | | | 73/38 |
| 2003/0230468 | A1* | 12/2003 | Uh | B65G 13/12 |
| | | | | 198/817 |
| 2004/0211664 | A1* | 10/2004 | Wang | C25F 7/00 |
| | | | | 204/297.06 |
| 2006/0075968 | A1* | 4/2006 | Leung | C23C 16/4401 |
| | | | | 118/723 R |
| 2007/0080057 | A1* | 4/2007 | Mizohata | C25D 5/04 |
| | | | | 204/198 |

FOREIGN PATENT DOCUMENTS

| | | |
|---|---|---|
| CN | 102023164 A | 4/2011 |
| CN | 201803915 U | 4/2011 |
| CN | 202794060 U | 3/2013 |
| CN | 203164553 U | 8/2013 |
| CN | 103760621 A | 4/2014 |
| JP | 2002-214013 A | 7/2002 |
| JP | 2003-327357 A | 11/2003 |
| JP | 2013-171002 A | 9/2013 |

* cited by examiner

DETECTION DEVICE AND DETECTION METHOD

FIELD OF THE INVENTION

The present invention relates to the field of display technology, and particularly relates to a detection device and a detection method.

BACKGROUND OF THE INVENTION

A display panel includes an array substrate and an alignment substrate arranged to be opposite to the array substrate, wherein both of the array substrate and the alignment substrate are manufactured by a series of production processes.

A glass substrate used for manufacturing the array substrate or the alignment substrate is transported among various process equipments in a process of manufacturing the array substrate or the alignment substrate, and the glass substrate frequently contacts and collides with transfer equipment in a transportation process, so that the glass substrate is likely to be damaged, resulting in that the manufactured array substrate or alignment substrate cannot be used. More seriously, when the damaged glass substrate is processed, residual glass fragments on the glass substrate result in blockage and scratch damage to the process equipment to cause serious economic loss.

Therefore, how to effectively detect whether the glass substrate is damaged in time is particularly important in the display panel manufacturing industry.

SUMMARY OF THE INVENTION

The present invention provides a detection device and a detection method, which can be used for effectively judging whether a substrate is damaged.

To realize the above object, the present invention provides a detection device used for detecting substrate damage, including:

a seal chamber, wherein a substrate to be detected is horizontally placed in the seal chamber; and a gas flow output unit, wherein the gas flow output unit is connected with the seal chamber, and the gas flow output unit is used for outputting detection gas flow to the upper surface of the substrate;

a gas flow detection unit, wherein the gas flow detection unit is located below the substrate, and the gas flow detection unit is used for detecting whether leak gas flow exists on the lower surface of the substrate, if the gas flow detection unit detects that the leak gas flow exists on the lower surface of the substrate, it is judged that the substrate is damaged; if the gas flow detection unit detects that no leak gas flow exists on the lower surface of the substrate, it is judged that the substrate is not damaged.

Optionally, the detection device further includes a carrying unit, and the carrying unit is located between the gas flow detection unit and the substrate; and the carrying unit is used for supporting the substrate and driving the substrate to move in the seal chamber.

Optionally, the carrying unit includes a plurality of rolling shafts arranged in parallel, the rolling shafts are arranged below the substrate, each rolling shaft includes a plurality of delivery rollers and a connecting rod, and the connecting rod is connected with all the delivery rollers in the rolling shaft;

the connecting rod is used for controlling all the delivery rollers in the rolling shaft to synchronously move; and the rollers are used for driving the substrate to move at a preset speed.

Optionally, the carrying unit further includes guide wheels, and the guide wheels are located at both ends of the connecting rod; and the guide wheels are used for controlling the substrate to horizontally move along a direction vertical to the connecting rod, when the rollers drive the substrate to move.

Optionally, the gas flow output unit includes a gas inlet module and a plurality of gas transmission branches, the gas inlet module is arranged on the seal chamber, the gas transmission branches are arranged in the seal chamber, each gas transmission branch includes a conveying hose and a nozzle, one end of the conveying hose is connected with the gas inlet module, and the other end of the conveying hose is connected with the nozzle; and the gas inlet module is used for outputting a detection gas to the upper surface of the substrate through the gas transmission branches to form the detection gas flow on the upper surface of the substrate.

Optionally, the gas inlet module includes a gas inlet pipeline, a filter and a closed buffering box, the filter is arranged between the gas inlet pipeline and the closed buffering box, and the closed buffering box is connected with the conveying hose;

the gas inlet pipeline is used for conveying the detection gas into the closed buffering box;

the filter is used for filtering impurities in the detection gas; and the closed buffering box is used for storing the detection gas and conveying the detection gas to the conveying hose.

Optionally, all the nozzles are located on the same horizontal plane and are arranged in a row.

Optionally, the gas flow output unit further includes a first fixing plate, and all the nozzles are fixed on the first fixing plate.

Optionally, the gas flow detection unit further includes a plurality of gas flow detection subunits, and each gas flow detection subunit is used for detecting whether the leak gas flow exists in a region on the substrate correspondingly right above the gas flow detection subunit;

if the gas flow detection subunit detects that the leak gas flow exists in the region on the substrate correspondingly right above the gas flow detection subunit, it is judged that the region on the substrate correspondingly right above the gas flow detection subunit is damaged; if the gas flow detection subunit detects that no leak gas flow exists in the region on the substrate correspondingly right above the gas flow detection subunit, it is judged that the region on the substrate correspondingly right above the gas flow detection subunit is not damaged.

Optionally, all the gas flow detection subunits are located on the same horizontal plane and are arranged in a row.

Optionally, the gas flow detection unit further includes a second fixing plate, and all the gas flow detection subunits are fixed on the second fixing plate.

Optionally, the gas flow detection subunit is a gas flow sensor, and the gas flow sensor is used for generating an analog signal when detecting the leak gas flow; and the detection device further includes a signal converter and an alarm, and the signal converter is connected with the gas flow sensor and the alarm;

the signal converter is used for converting the analog signal into an electric signal; and the alarm is used for alarming when receiving the electric signal.

Optionally, the detection device further includes a substrate detection unit, and the substrate detection unit is connected with the gas flow output unit; and the substrate detection unit is used for detecting whether the substrate is below the gas flow output unit, if detecting that the substrate is below the gas flow output unit, the substrate detection unit controls the gas flow output unit to output the detection gas flow, and if detecting that the substrate is not below the gas flow output unit, the substrate detection unit controls the gas flow output unit to stop outputting the detection gas flow.

Optionally, the detection device further includes a protective housing, and the protective housing is arranged at the outside of the seal chamber; and the protective housing is used for protecting the seal chamber.

Optionally, the detection gas flow is air flow.

To realize the above object, the present invention further provides a detection method used for detecting substrate damage, the detection method is based on a detection device, the detection device includes a seal chamber, a gas flow output unit and a gas flow detection unit, a substrate to be detected is horizontally placed in the seal chamber, the gas flow output unit is connected with the seal chamber, the gas flow detection unit is located below the substrate, and the detection method includes steps of:

outputting, by the gas flow output unit, detection gas flow to the upper surface of the substrate;

detecting, by the gas flow detection unit, whether leak gas flow exists on the lower surface of the substrate, if the gas flow detection unit detects that the leak gas flow exists on the lower surface of the substrate, judging that the substrate is damaged; if the gas flow detection unit detects that no leak gas flow exists on the lower surface of the substrate, judging that the substrate is not damaged.

The present invention has the following beneficial effects:

the present invention provides the detection device and the detection method, the detection device includes the seal chamber, the gas flow output unit and the gas flow detection unit, wherein the substrate to be detected is horizontally placed in the seal chamber, the gas flow detection unit is located in the seal chamber and below the substrate, the gas flow output unit is connected with the seal chamber, the gas flow output unit is used for outputting the detection gas flow to the upper surface of the substrate, and the gas flow detection unit is used for detecting whether the leak gas flow exists on the lower surface of the substrate. According to the technical solutions of the present invention, the detection gas flow is formed on the upper surface of the substrate through the gas flow output unit, meanwhile whether the leak gas flow exists on the lower surface of the substrate is detected by the gas flow detection unit, and whether the substrate is damaged is judged based on a detection result of the gas flow detection unit.

DETAILED DESCRIPTION OF THE EMBODIMENTS

To make those skilled in the art better understand the technical solutions of the present invention, the detection device and the detection method provided by the present invention will be described below in detail in combination with the accompanying drawings.

Embodiment 1

Figure 1:
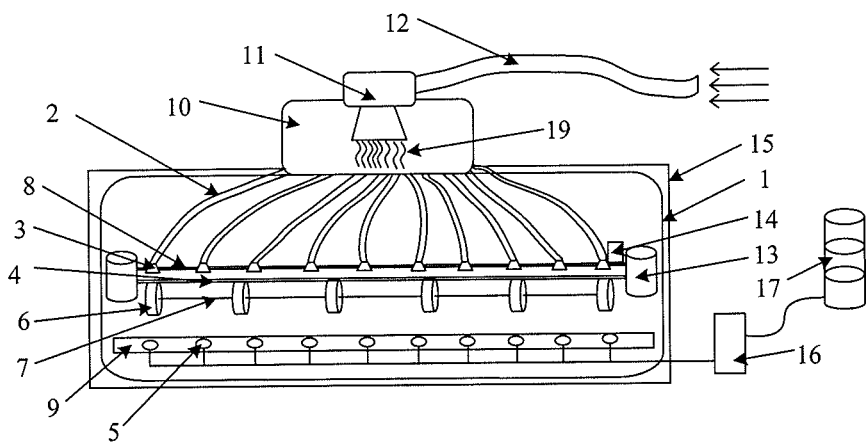
FIG. 1 is a front view of a detection device provided by Embodiment 1 of the present invention.
Figure 2:
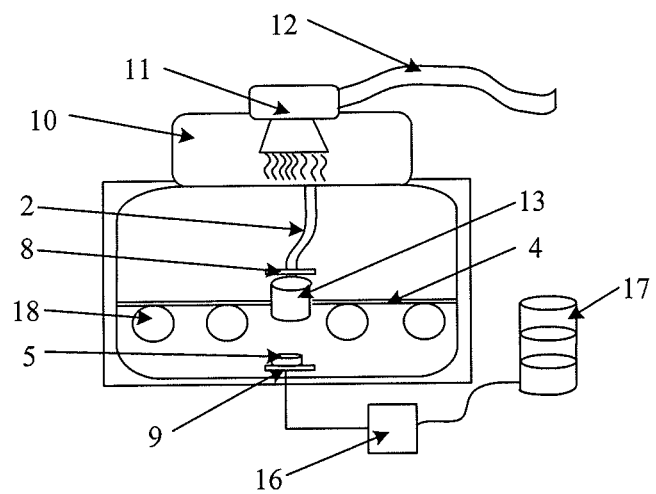
FIG. 2 is a side view of FIG. 1.
Figure 3:
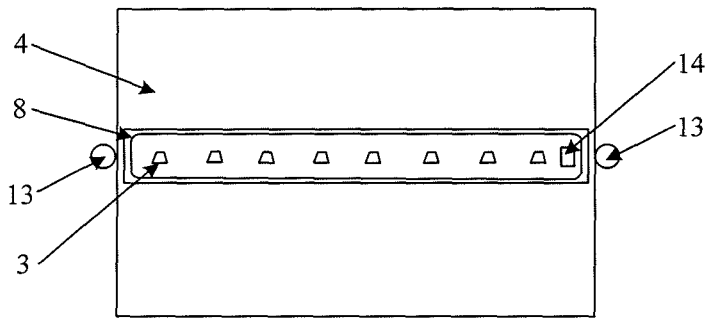
FIG. 3 is a top view of interior of a seal chamber in FIG. 1.

FIG. 1 is a front view of a detection device provided by Embodiment 1 of the present invention, FIG. 2 is a side view of FIG. 1, and FIG. 3 is a top view of interior of a seal chamber in FIG. 1. As shown in FIG. 1 to FIG. 3, the detection device is used for detecting the damage to a substrate 4, and the detection device includes a seal chamber 1, a gas flow output unit and a gas flow detection unit, wherein the substrate 4 to be detected is horizontally placed in the seal chamber 1, the gas flow detection unit is located in the seal chamber 1 and below the substrate 4, the gas flow output unit is connected with the seal chamber 1, the gas flow output unit is used for outputting detection gas flow to the upper surface of the substrate 4, and the gas flow detection unit is used for detecting whether leak gas flow exists on the lower surface of the substrate 4.

According to the present invention, the detection gas flow is formed on the upper surface of the substrate 4 through the gas flow output unit, meanwhile whether the leak gas flow exists on the lower surface of the substrate 4 is detected by the gas flow detection unit, and whether the substrate 4 is damaged can be judged based on a detection result of the gas flow detection unit.

The inventive principle of the present invention lies in that, when the gas flow output unit forms the detection gas flow on the upper surface of the substrate 4, a high pressure area is formed on the upper surface of the substrate 4, at this time, a normal pressure exists on the lower surface of the substrate 4, if the substrate 4 is damaged, the detection gas flow will pass through the damaged position to form the leak gas flow on the lower surface of the substrate 4, at this time, the gas flow detection unit detects that the leak gas flow exists on the lower surface of the substrate 4, and thus it can be judged that the substrate 4 is damaged; if the substrate 4 is not damaged, the detection gas flow will not pass through the substrate 4, at this time, no leak gas flow is formed on the lower surface of the substrate 4, the gas flow detection unit detects that no leak gas flow exists on the lower surface of the substrate 4, and thus it can be judged that the substrate 4 is not damaged.

In this embodiment, optionally, the detection device further includes a carrying unit, the carrying unit is located between the gas flow detection unit and the substrate 4, and the carrying unit is used for supporting the substrate 4 and driving the substrate 4 to move in the seal chamber 1. Specifically, the carrying unit includes a plurality of rolling shafts 18 arranged in parallel, the rolling shafts 18 are arranged below the substrate 4, each rolling shaft 18 includes a plurality of delivery rollers 6 and a connecting rod 7, the connecting rod 7 is connected with all the delivery rollers 6 in the rolling shaft 18, the connecting rod 7 is used for controlling all the delivery rollers 6 in the rolling shaft 18 to synchronously move, and the rollers 6 are used for driving the substrate 4 to move at a preset speed. In this embodiment, when the rollers 6 rotate, the substrate 4 will horizontally move on the horizontal plane in a direction vertical to the connecting rod 7.

Further optionally, the carrying unit further includes guide wheels 13, the guide wheels 13 are located at both ends of the connecting rod 7, and the guide wheels 13 are used for controlling the substrate 4 to horizontally move along the direction vertical to the connecting rod 7, when the rollers 6 drive the substrate 4 to move. In actual production, when the rollers 6 drive the substrate 4 to move, the substrate 4 may generate lateral sway, such that the substrate 4 cannot horizontally move along the direction vertical to the connecting rod 7 and the substrate 4 falls off from the rolling shafts 18 finally. To solve the above problem, the guide wheels 13 are arranged at both ends of the connecting rod 7 in the present invention, and the guide wheels 13 can limit the substrate 4 to only horizontally move along the direction vertical to the connecting rod 7, so as to avoid the lateral sway of the substrate 4.

In this embodiment, the gas flow output unit includes a gas inlet module and a plurality of gas transmission branches, the gas inlet module is arranged on the seal chamber 1, the gas transmission branches are arranged in the seal chamber 1, each gas transmission branch includes a conveying hose 2 and a nozzle 3, one end of the conveying hose 2 is connected with the gas inlet module, the other end of the conveying hose 2 is connected with the nozzle 3, and the gas inlet module is used for outputting a detection gas 19 to the upper surface of the substrate 4 through the gas transmission branches and the nozzles 3 to form the detection gas flow on the upper surface of the substrate 4. The gas inlet module includes a gas inlet pipeline 12, a filter 11 and a closed buffering box 10, the filter 11 is arranged between the gas inlet pipeline 12 and the closed buffering box 10, the closed buffering box 10 is connected with the conveying hose 2, the gas inlet pipeline 12 is used for conveying the detection gas 19 into the closed buffering box 10, the filter 11 is used for filtering impurities in the detection gas 19, and the closed buffering box 10 is used for storing the detection gas 19, conveying the filtered detection gas 19 to the conveying hose 2 and finally conveying the detection gas to the upper surface of the substrate 4 through the nozzle 3.

In this embodiment, the gas inlet module not only can be used for storing the detection gas 19, but also can be used for filtering the impurities in the detection gas 19, such that the gas reaching the upper surface of the substrate 4 is a clean and dry gas, and accordingly the pollution of the detection gas 19 to the substrate 4 is avoided. In this embodiment, optionally, the detection gas 19 is clean and dry air, and correspondingly, the detection gas flow is air flow.

Optionally, the gas flow output unit further includes a first fixing plate 8, and all the nozzles 3 are fixed on the first fixing plate 8. Further optionally, all the nozzles 3 are located on the same horizontal plane and are arranged in a row, and specifically, all the nozzles 3 are arranged in a row along a direction vertical to the movement direction of the substrate 4. It needs to be noted that, the above-mentioned arrangement manner of the nozzles 3 is merely an optional solution in this embodiment and the technical solutions of the present application are not limited thereto, for example, in this embodiment, all the nozzles 3 can also be arranged on the same horizontal plane, and the projections of all the nozzles 3 on the substrate 4 are uniformly distributed (no corresponding accompanying drawing is given).

In this embodiment, the gas flow detection unit includes a plurality of gas flow detection subunits 5, and each gas flow detection subunit 5 is used for detecting whether the leak gas flow exists in a region on the substrate 4 correspondingly right above the gas flow detection subunit 5, if the gas flow detection subunit 5 detects that the leak gas flow exists in the region on the substrate 4 correspondingly right above the gas flow detection subunit 5, it is judged that the region on the substrate 4 correspondingly right above the gas flow detection subunit 5 is damaged; if the gas flow detection subunit 5 detects that no leak gas flow exists in the region on the substrate 4 correspondingly right above the gas flow detection subunit 5, it is judged that the region on the substrate 4 correspondingly right above the gas flow detection subunit 5 is not damaged.

Optionally, the gas flow detection unit further includes a second fixing plate 9, and all the gas flow detection subunits 5 are fixed on the second fixing plate 9. Further optionally, all the gas flow detection subunits 5 are located on the same horizontal plane and are arranged in a row, and specifically, all the gas flow detection subunits 5 are arranged in a row along a direction vertical to the movement direction of the substrate 4. It needs to be noted that, the above-mentioned arrangement manner of the gas flow detection subunits 5 is merely an optional solution in this embodiment and the technical solutions of the present application are not limited thereto, for example, in this embodiment, all the gas flow detection subunits 5 can also be arranged on the same horizontal plane, and the projections of all the gas flow detection subunits 5 on the substrate 4 are uniformly distributed (no corresponding accompanying drawing is given).

Optionally, the gas flow detection subunit 5 is a gas flow sensor, the gas flow sensor is used for generating an analog signal when detecting the leak gas flow, the detection device further includes a signal converter 16 and an alarm 17, the signal converter 16 is connected with the gas flow sensor and the alarm 17, the signal converter 16 is used for converting the analog signal into an electric signal, and the alarm 17 is used for alarming when receiving the electric signal. In this embodiment, by arranging the signal converter 16 and the alarm 17, when the gas flow detection subunit 5 detects that the substrate 4 is damaged, an operator can be notified in time to prevent the damaged substrate 4 from entering the next manufacturing procedure.

Optionally, the detection device further includes a substrate detection unit 14, the substrate detection unit 14 is located in the seal chamber 1 and is connected with the gas flow output unit, the substrate detection unit 14 is used for detecting whether the substrate 4 is below the gas flow output unit, if detecting that the substrate 4 is below the gas flow output unit, the substrate detection unit 14 controls the gas flow output unit to output the detection gas flow, and if detecting that the substrate 4 is not below the gas flow output unit, the substrate detection unit 14 controls the gas flow output unit to stop outputting the detection gas flow. In this embodiment, by providing the substrate detection unit 14, the detection device is more intelligent. More importantly, in a case where the substrate 4 is not below the gas flow output unit, the substrate detection unit 14 can effectively prevent the detection gas 19 output by the gas flow output unit from being detected by the gas flow detection unit, so as to avoid a wrong detection. It needs to be noted that, the substrate detection unit 14 may be fixed on the first fixing plate 8 in this embodiment.

Optionally, the detection device further includes a protective housing 15, and the protective housing 15 is arranged at the outside of the seal chamber 1. The detection device provided by this embodiment has higher requirements on the sealing property of the seal chamber 1, and the protective housing 15 is arranged at the outside of the seal chamber 1 to effectively protect the seal chamber 1.

The operations of the detection device provided by this embodiment will be described below in detail in combination with the accompanying drawings.

At first, the carrying unit drives the substrate 4 to move to the space below the gas flow output unit, at this time, the substrate detection unit 14 detects the existence of the substrate 4 and controls the gas flow output unit to output the detection gas flow to the upper surface of the substrate 4 through the nozzle 3. And then, the gas flow detection unit starts to detect whether the leak gas flow exists on the lower surface of the substrate 4, and if any gas flow detection subunit 5 in the gas flow detection unit detects the leak gas flow, it can be judged that the region on the substrate 4 located right above the gas flow detection subunit 5 having detected the leak gas flow is damaged. In this embodiment, all the nozzles 3 are located on the same horizontal plane and are arranged in a row, all the gas flow detection subunits 5 are located on the same horizontal plane and are arranged in a row, the row of nozzles 3 and the row of gas flow detection subunits 5 are arranged oppositely in parallel, and in the process of the carrying unit driving the substrate 4 to move, the detection gas flow can sweep over various regions on the upper surface of the substrate 4. Finally, when the carrying unit drives the substrate 4 to move until the substrate detection unit 14 cannot detect the existence of the substrate 4, the substrate detection unit 14 controls the gas flow output unit to stop outputting the detection gas flow, and the detection of one substrate 4 is completed.

Embodiment 1 of the present invention provides the detection device, the detection device includes the seal chamber, the gas flow output unit and the gas flow detection unit, wherein the substrate to be detected is horizontally placed in the seal chamber, the gas flow detection unit is located in the seal chamber and below the substrate, the gas flow output unit is connected with the seal chamber, the gas flow output unit is used for outputting the detection gas flow to the upper surface of the substrate, and the gas flow detection unit is used for detecting whether the leak gas flow exists on the lower surface of the substrate. According to the technical solutions of the present invention, the detection gas flow is formed on the upper surface of the substrate through the gas flow output unit, meanwhile whether the leak gas flow exists on the lower surface of the substrate is detected by the gas flow detection unit, and whether the substrate is damaged is judged based on a detection result of the gas flow detection unit.

Embodiment 2

Figure 4:
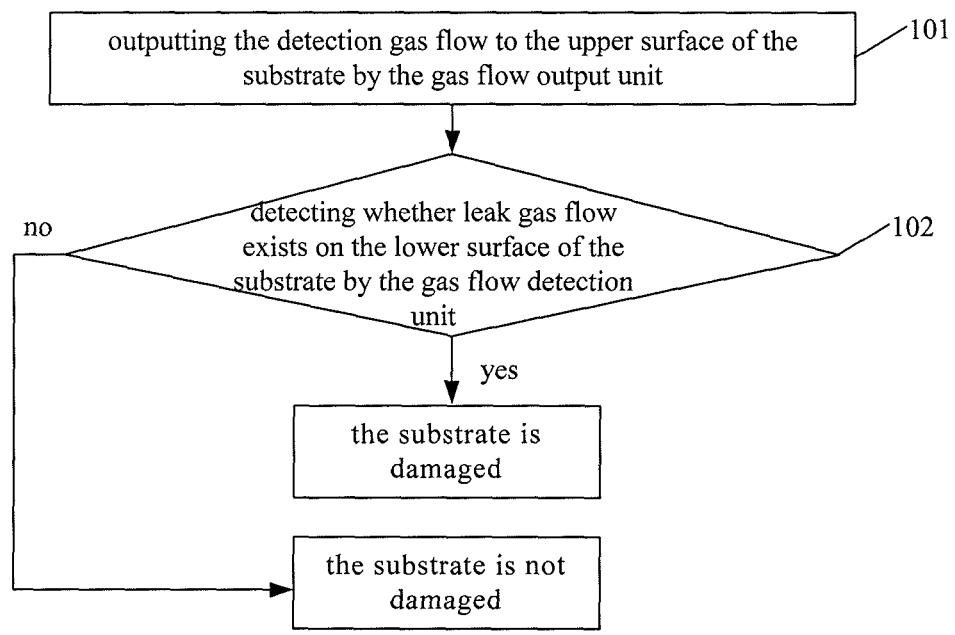
FIG. 4 is a flowchart of a detection method provided by Embodiment 2 of the present invention.

FIG. 4 is a flowchart of a detection method provided by Embodiment 2 of the present invention, as shown in FIG. 4, the detection method is based on a detection device, wherein the detection device includes a seal chamber, a gas flow output unit and a gas flow detection unit, a substrate to be detected is horizontally placed in the seal chamber, the gas flow output unit is connected with the seal chamber, the gas flow detection unit is located below the substrate, and the detection method includes steps of:

step 101, outputting, by the gas flow output unit, detection gas flow to the upper surface of the substrate; and step 102, detecting, by the gas flow detection unit, whether leak gas flow exists on the lower surface of the substrate.

In the step 102, if the gas flow detection unit detects that the leak gas flow exists on the lower surface of the substrate, it is judged that the substrate is damaged, and if the gas flow detection unit detects that no leak gas flow exists on the lower surface of the substrate, it is judged that the substrate is not damaged.

The inventive principle of the present invention lies in that, when the gas flow output unit forms the detection gas flow on the upper surface of the substrate, a high pressure area is formed on the upper surface of the substrate, at this time, a normal pressure exists on the lower surface of the substrate, if the substrate is damaged, the detection gas flow will pass through the damaged position to form leak gas flow on the lower surface of the substrate, at this time, the gas flow detection unit detects that the leak gas flow exists on the lower surface of the substrate, and thus it can be judged that the substrate is damaged; if the substrate is not damaged, the detection gas flow will not pass through the substrate, at this time, no leak gas flow is formed on the lower surface of the substrate, the gas flow detection unit detects that no leak gas flow exists on the lower surface of the substrate, and thus it can be judged that the substrate is not damaged.

Therefore, based on the above-mentioned step 101 and step 102, whether the substrate is damaged can be judged.

Embodiment 2 of the present invention provides the detection method, the detection method includes steps of: outputting, by the gas flow output unit, detection gas flow to the upper surface of the substrate; and detecting, by the gas flow detection unit, whether leak gas flow exists on the lower surface of the substrate, if the gas flow detection unit detects that the leak gas flow exists on the lower surface of the substrate, it is judged that the substrate is damaged, and if the gas flow detection unit detects that no leak gas flow exists on the lower surface of the substrate, it is judged that the substrate is not damaged. According to the technical solutions of the present invention, the detection gas flow is formed on the upper surface of the substrate through the gas flow output unit, meanwhile whether the leak gas flow exists on the lower surface of the substrate is detected by the gas flow detection unit, and whether the substrate is damaged is judged based on a detection result of the gas flow detection unit.

It can be understood that, the foregoing implementations are merely exemplary implementations used for illustrating the principle of the present invention, but the present invention is not limited thereto. Those of ordinary skill in the art can make various variations and improvements without departing from the spirit and essence of the present invention, and these variations and improvements shall fall within the protection scope of the present invention.

The invention claimed is:

1. A detection device used for detecting whether a substrate is damaged, comprising:
   a seal chamber, wherein a substrate to be detected is horizontally placed in the seal chamber;
   a gas flow output unit, wherein the gas flow output unit is connected with the seal chamber, and the gas flow output unit comprises a gas inlet module and a plurality of gas transmission branches, the gas inlet module is arranged on the seal chamber, the gas transmission branches are arranged in the seal chamber, each gas transmission branch comprises a conveying hose and a nozzle which is located above the substrate, one end of each conveying hose is connected with the gas inlet module, and the other end of each conveying hose is connected with the respective nozzle, and the gas inlet module is configured to output a detection gas to an upper surface of the substrate through the gas transmission branches to form a detection gas flow on the upper surface of the substrate; and
   a gas flow detection unit, wherein the gas flow detection unit is arranged in the seal chamber and is located below the substrate, and the gas flow detection unit is configured to detect whether leak gas flow exists on a lower surface of the substrate,
   if the gas flow detection unit detects that the leak gas flow exists on the lower surface of the substrate, the substrate is indicated to be damaged; if the gas flow detection unit detects that no leak gas flow exists on the lower surface of the substrate, the substrate is indicated to be not damaged.

2. The detection device of claim 1, further comprising a carrying unit, wherein the carrying unit is located between the gas flow detection unit and the substrate; and the carrying unit is used for supporting the substrate and driving the substrate to move in the seal chamber.

3. The detection device of claim 2, wherein the carrying unit comprises a plurality of rolling shafts arranged in parallel, the rolling shafts are arranged below the substrate, each rolling shaft comprises a plurality of delivery rollers and a connecting rod, and the connecting rod is connected with all the delivery rollers in the rolling shaft;

the connecting rod is used for controlling all the delivery rollers in the rolling shaft to synchronously move; and the rollers are used for driving the substrate to move at a preset speed.

4. The detection device of claim 3, wherein the carrying unit further comprises guide wheels, and the guide wheels are located at both ends of the connecting rod; and the guide wheels are used for controlling the substrate to horizontally move along a direction vertical to the connecting rod, when the rollers drive the substrate to move.

5. The detection device of claim 1, wherein the gas inlet module comprises a gas inlet pipeline, a filter and a closed buffering box, the filter is arranged between the gas inlet pipeline and the closed buffering box, and the closed buffering box is connected with the conveying hoses;

the gas inlet pipeline is used for conveying the detection gas into the closed buffering box;

the filter is used for filtering impurities in the detection gas; and the closed buffering box is used for storing the detection gas and conveying the detection gas to the conveying hose.

6. The detection device of claim 1, wherein all the nozzles are located on a same horizontal plane and are arranged in a row.

7. The detection device of claim 1, wherein the gas flow output unit further comprises a first fixing plate, and all the nozzles are fixed on the first fixing plate.

8. The detection device of claim 1, wherein the gas flow detection unit comprises a plurality of gas flow detection subunits, and each gas flow detection subunit is used for detecting whether the leak gas flow exists in a region on the substrate correspondingly right above the gas flow detection subunit; and if the gas flow detection subunit detects that the leak gas flow exists in the region on the substrate correspondingly right above the gas flow detection subunit, the region on the substrate correspondingly right above the gas flow detection subunit is indicated to be damaged; and if the gas flow detection subunit detects that no leak gas flow exists in the region on the substrate correspondingly right above the gas flow detection subunit, the region on the substrate correspondingly right above the gas flow detection subunit is indicated to be not damaged.

9. The detection device of claim 8, wherein all the gas flow detection subunits are located on a same horizontal plane and are arranged in a row.

10. The detection device of claim 9, wherein the gas flow detection unit further comprises a second fixing plate, and all the gas flow detection subunits are fixed on the second fixing plate.

11. The detection device of claim 8, wherein the gas flow detection subunit is a gas flow sensor, and the gas flow sensor is used for generating an analog signal when detecting the leak gas flow; and the detection device further comprises a signal converter and an alarm, and the signal converter is connected with the gas flow sensor and the alarm;

the signal converter is used for converting the analog signal into an electric signal; and the alarm is used for alarming when receiving the electric signal.

12. The detection device of claim 1, further comprising a substrate detection unit, wherein the substrate detection unit is connected with the gas flow output unit; and the substrate detection unit is used for detecting whether the substrate is below the gas flow output unit, if detecting that the substrate is below the gas flow output unit, the substrate detection unit controls the gas flow output unit to output the detection gas flow, and if detecting that the substrate is not below the gas flow output unit, the substrate detection unit controls the gas flow output unit to stop outputting the detection gas flow.

13. The detection device of claim 1, further comprising a protective housing, wherein the protective housing is arranged at the outside of the seal chamber; and the protective housing is used for protecting the seal chamber.

14. The detection device of claim 1, wherein the detection gas flow is air flow.

15. A detection method, wherein the detection method is used for detecting substrate damage, the detection method is based on a detection device, the detection device comprises a seal chamber, a gas flow output unit and a gas flow detection unit, a substrate to be detected is horizontally placed in the seal chamber, the gas flow output unit is connected with the seal chamber, and the gas flow output unit comprises a gas inlet module and a plurality of gas transmission branches, the gas inlet module is arranged on the seal chamber, the gas transmission branches are arranged in the seal chamber, each gas transmission branch comprises a conveying hose and a nozzle which is located above the substrate, one end of each conveying hose is connected with the gas inlet module, and the other end of each conveying hose is connected with the respective nozzle, and the gas inlet module is configured to output a detection gas to an upper surface of the substrate through the gas transmission branches to form a detection gas flow on the upper surface of the substrate, the gas flow detection unit is arranged in the seal chamber and is located below the substrate, and the detection method comprises steps of:

outputting, by the gas flow output unit, detection gas flow to the upper surface of the substrate;

detecting, by the gas flow detection unit, whether leak gas flow exists on a lower surface of the substrate, if the gas flow detection unit detects that the leak gas flow exists on the lower surface of the substrate, the substrate is indicated to be damaged; if the gas flow detection unit detects that no leak gas flow exists on the lower surface of the substrate, the substrate is indicated to be not damaged.

* * * * *